July 6, 1926.
W. AMES
CALIPER GAUGE
Filed March 26, 1924
1,591,261
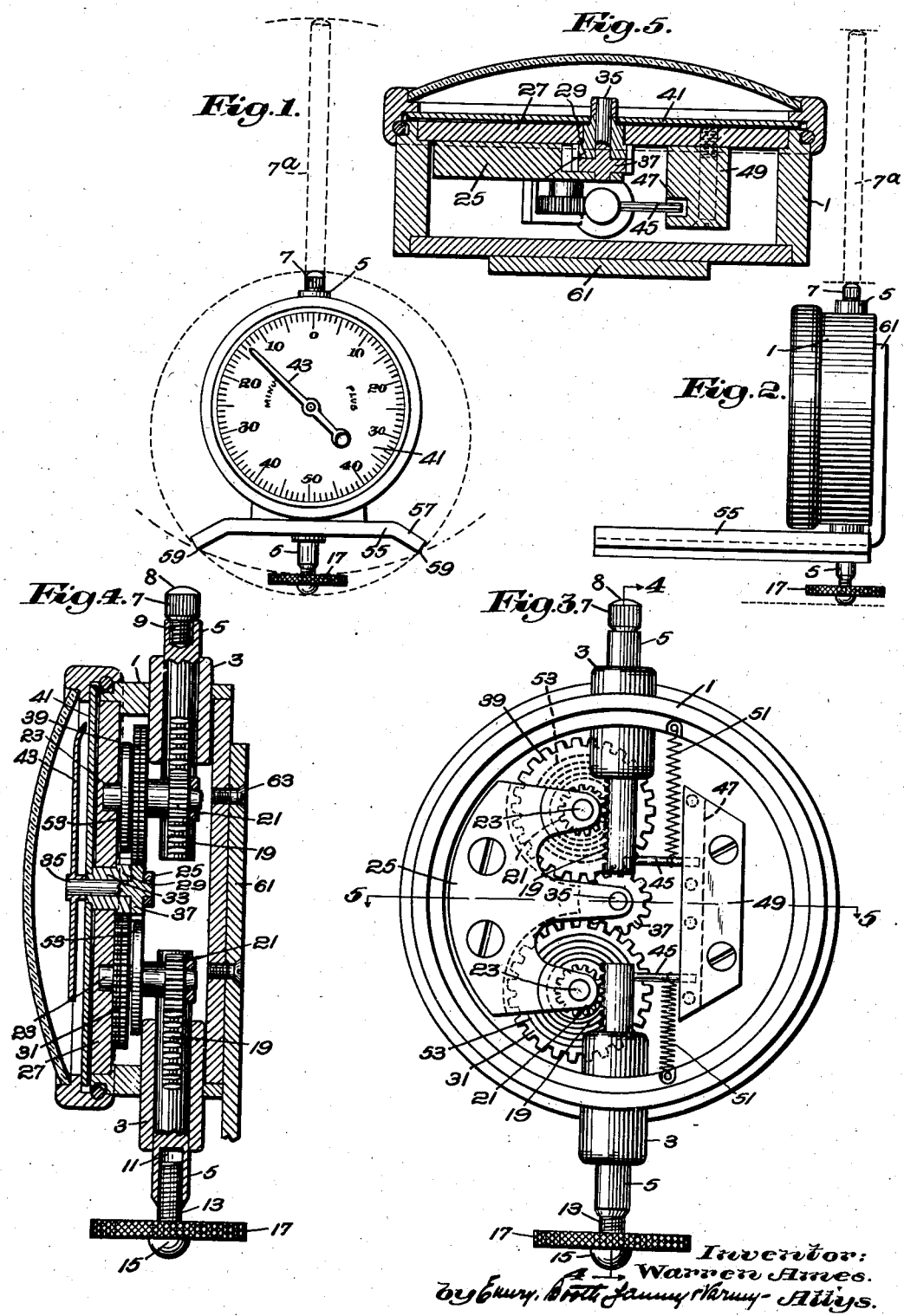
Inventor:
Warren Ames.

Patented July 6, 1926.

1,591,261

UNITED STATES PATENT OFFICE.

WARREN AMES, OF WALTHAM, MASSACHUSETTS, ASSIGNOR TO B. C. AMES CO., OF WALTHAM, MASSACHUSETTS, A CORPORATION OF MASSACHUSETTS.

CALIPER GAUGE.

Application filed March 26, 1924. Serial No. 701,993.

My invention relates to calipering instruments and particularly but not exclusively to one for calipering the inside diameters of cylindrical surfaces.

My invention will be best understood from the following description when read in the light of the accompanying drawings of one specific embodiment of my invention selected for illustrative purposes, while the scope of my invention will be more particularly pointed out in the appended claims.

In the drawing:—

Fig. 1 shows a plan view of the instrument indicating its method of application to cylindrical surfaces of various diameters;

Fig. 2 is a side elevation according to Fig. 1;

Fig. 3 is a rear view with the back plate removed;

Fig. 4 is a section on the line 4—4 of Fig. 3; and

Fig. 5 is a section on line 5—5 of Fig. 3.

Referring to the drawing I have shown an indicator having a frame exemplified herein by a casing 1 opposite sides of which are perforated and receive bushings 3 through which extend reciprocatory cylindrical calipering rods or arms 5. As indicated the upper rod 5 carries a removable end portion 7 having a calipering point 8, the end portion for this purpose having the screw threaded stem 9 received in a screw threaded socket in the end of the rod, and by this construction I am able to employ end members 7 of different length so as to accommodate the instrument to cylinders of various diameters, as is indicated at 7ª in Fig. 1. The lower rod 5 as viewed in the drawing has a screw threaded socket 11 opening on the end of the rod which socket receives the outer portion 13 of the rod, the outer portion carrying the member 15 providing a calipering point and also carrying a knurled head 17 by means of which the outer member may be rotated for screwing it more or less into the socket 11 and thus adjusting the effective length of the lower rod 5.

At its inner end each rod 5 is provided at one side thereof with rack teeth 19, the rack teeth meshing with pinions 21 which are mounted on shafts 23 rotatably supported by the bracket 25 and the top plate 27 of the casing. At the center of the top plate 27 is a pinion 29 in mesh with a pinion 31 carried by one of the shafts 23, the pinion 29 having a hub 33 mounted in the top plate 27. The hub 33 and pinion 29 are perforated and rotatably receive a shaft 35 which shaft carries a pinion 37 and is supported at its inner end in the bracket 25. Meshing with the pinion 37 is a gear wheel 39 carried on the upper shaft 23 as viewed in the drawing. The hub 33 of the pinion 29 thus driven by the lower calipering rod 5 carries a rotatable dial plate 41, while the shaft 35 driven by the upper calipering rod carries a rotatable indicator hand 43.

As illustrated in Fig. 4 the calipering rods 5 carry arms 45 which at their outer ends engage a slot 47 formed in the bracket 49 secured to the top plate 27, this construction preventing rotation of the rods relatively to the other parts of the instrument. Each rod 45 is connected to the casing by means of a spring 51 normally tending to move the rods outwardly relatively to the casing. Lost motion in the gear wheels is taken up by the helical springs 53 which surround the shafts 23, the gear wheels for this purpose being split in planes transverse to the axis of the gears as shown in Fig. 4 and one end of the springs being connected to the adjacent half of the associated gear and the other end of the springs being connected to a fixed part of the casing.

It will be noted by the above described construction that the calipering rods 5 are movable relatively to each other and to the indicator casing and that one rod causes rotation of the dial plate while the other causes rotation of the indicator hand. It will also be observed that when the rods move in the same direction, as for example upwardly as viewed in the drawing, the dial and indicator hand will be moved in the same direction, and that for a relative movement between the indicator hand and dial plate there must be a relative movement between the calipering rods 5, and further as will be readily apparent the relative movement between the dial plate and indicator hand is directly proportional to the algebraic difference in motion between the two rods.

For placing the rods on the cylinder diameter to be measured I provide a support in the form of a plate having the base 55, the end portions 57 of the base being formed at an angle to the body of the base so as to present corners 59 for contacting the walls of the cylinder to be calipered. The casing 1 is secured by means of screws 63 to the tongue 61 formed integrally with the plate 55. As will be observed by reference to Fig. 1 the corners 59 of the end portions 57 of the plate 55 rest on the cylinder walls at opposite ends of a chord of the circle representing the transverse cross section of a cylinder whose diameter is to be measured, while the calipering points at the ends of the rods are on a line which is normal to the chord and bisects the same, and as will be obvious by this means the calipering points will always be centered on the diameter to be measured.

My instrument may be used in various ways, as for example it may be first tested with a set gauge, and while in the gauge the knurled head 17 can be rotated to cause the indicator needle to coincide with the zero point on the dial plate. If the calipering points are now moved from between the set gauge and the instrument is applied to a cylinder whose diameter is to be measured the readings will indicate the amounts the diameter varies from the set gauge, the readings at one side of the zero point denoting oversizes and the readings at the other side of the zero point denoting undersizes. The graduations of the dial for this purpose may be calibrated in any convenient unit, as for example thousandths of an inch.

Although I have described for purposes of illustration one specific embodiment of my invention it is to be understood that within the scope of my invention wide deviations may be made therefrom without departing from the spirit of my invention.

Claims:

1. A calipering instrument, having in combination, a pair of caliper members, an indicator comprising a frame, said indicator for showing the degree of separation of said caliper members, said caliper members each being independently movable relatively to the other and to said frame of said indicator for contact with opposed surfaces, and actuating mechanism for said indicator responsive to the algebraic difference in motion of said caliper members relatively to said frame.

2. An instrument for calipering the internal diameter of cylindrical surfaces, having in combination, caliper members, means for engaging such surfaces and serving to position said caliper members so as to contact diametrically opposite portions of such surfaces an indicator comprising a frame carried in fixed relation to said means, said indicator responsive to the position of said caliper members relatively to each other, said caliper members being independently movable relatively to each other and to said frame.

3. An instrument for calipering the internal diameter of cylindrical surfaces, having in combination, a pair of caliper members, a support carrying said caliper members, said support having means for engaging points on such surfaces spaced transversely thereon for positioning said caliper members on the diameters of such surfaces, an indicator comprising a frame carried by said support in fixed relation thereto, actuating means for said indicator operated by said caliper members and responsive to the position of said caliper members relatively to each other, said caliper members being independently movable relatively to each other and to said frame.

4. An instrument for calipering the internal diameter of cylindrical surfaces, having in combination, a member having portions for positioning it on chords of the transverse sections of such surfaces, an indicator casing carried in fixed relation to said member, oppositely positioned caliper members positioned in a plane normal to and bisecting said chords, said caliper members being independently movable relatively to the other and to said indicator casing for contact with opposed cylindrical walls, and indicator mechanism in said casing responsive to the albebraic difference in motion of said caliper members.

5. An instrument for calipering the internal diameter of cylindrical surfaces, having in combination, a member having portions for positioning it on chords of the transverse sections of such surfaces, an indicator casing carried in fixed relation to said member, oppositely positioned caliper members positioned in a plane normal to and bisecting said chords, said caliper members being independently movable relatively to the other and to said indicator casing, means for adjusting said indicator to a predetermined reading when said caliper members are in engagement with spaced surfaces, and indicator mechanism in said casing responsive to the algebraic difference in motion of said caliper members relatively to said indicator casing.

6. An instrument for calipering the internal diameter of cylindrical surfaces, having in combination, a member having portions for positioning it on chords of the transverse sections of such surfaces, an indicator casing carried in fixed relation to said member, oppositely positioned caliper members positioned in a plane normal to and bisecting said chords, said caliper members being independently movable relatively to the other and to said indicator casing, one of said caliper members having relatively movable parts for adjusting the effective length of said member, and indicator mechanism in said casing responsive to the algebraic difference in motion of said caliper members relatively to said indicator.

7. An instrument for calipering the internal diameter of cylindrical surfaces, having in combination, a member having portions for positioning it on chords of the transverse sections of such surfaces, an indicator casing carried in fixed relation to said member, oppositely positioned caliper members positioned in a plane normal to and bisecting said chords, said caliper members being independently movable relatively to the other and to said indicator casing, means for adjusting the effective length of said caliper member adjacent said chord, and indicator mechanism in said casing responsive to the algebraic difference in motion of said caliper members relatively to said indicator casing.

8. An instrument for calipering the internal diameter of cylindrical surfaces, having in combination, a member having portions for positioning it on chords of the transverse sections of such surfaces, an indicator casing carried in fixed relation to said member, rods carried by said member and extending in opposite directions therefrom, said rods being in a plane normal to and bisecting said chords.

9. An instrument for calipering the internal diameter of cylindrical surfaces, having in combination, a member having portions for positioning it on chords of the transverse sections of such surfaces, an indicator casing carried in fixed relation to said member, rods extending from said member in opposite directions, said rods being independently movable relatively to the other and to said member and having calipering points lying in a plane normal to and bisecting said chords, and indicating mechanism in said casing operated by said rods and responsive to the algebraic difference in motion of said rods relatively to said member.

10. An instrument for calipering the internal diameter of cylindrical surfaces, having in combination, a member having portions for positioning it on chords of the transverse sections of such surfaces, an indicator casing carried in fixed relation to said member, rods extending from said member in opposite directions, said rods being independently movable relatively to the other and to said member and having calipering points lying in a plane normal to and bisecting said chords, the calipering point of one of said rods being adjustable relatively to the body of said rod, and indicating mechanism in said casing operated by said rods and responsive to the algebraic difference in motion of said rods relatively to said member.

11. An instrument for calipering the internal diameter of cylindrical surfaces, having in combination, a member having portions for positioning it on chords of the transverse sections of such surfaces, an indicator casing carried in fixed relation to said member, rods extending from said member in opposite directions, said rods being independently movable relatively to the other and to said member and having calipering points lying in a plane normal to and bisecting said chords, the calipering point of said rod adjacent said chord being adjustable relatively to the body of said rod, and indicating mechanism in said casing operated by said rods and responsive to the algebraic difference in motion of said rods relatively to said member.

12. A calipering instrument, having in combination, a pair of calipering members, an indicator for showing the degree of separation of said members, said indicator having a frame supporting a movable graduated member and a movable pointer cooperating with the graduations of said graduated member, said calipering members being independently movable relatively to each other and to said frame of said indicator, and mechanism for causing equal motions of said calipering members in the same direction to move said graduated member and pointer equal amounts in the same direction and for causing relative motion between said calipering members to move said graduated member and pointer relatively to each other.

13. A calipering instrument, having in combination, a pair of caliper members, an indicator for showing the degree of separation of said members, said indicator having a frame supporting a dial plate mounted for angular motion and a pointer mounted for angular motion relatively to said dial plate, said caliper members independently movable relatively to the other and to said frame, and mechanism operated by one of said caliper members for angularly moving said dial plate and by the other caliper member for angularly moving said pointer.

14. A calipering instrument having in combination, a pair of caliper members, an indicator for showing the degree of separation of said members, said indicator having a dial plate mounted for angular motion and a pointer mounted for angular motion relatively to said dial plate, said caliper members independently movable relatively to the other and to said dial plate, and mechanism operated by said caliper members for causing relative angular motion of said dial plate and pointer in proportion to the algebraic difference in motion of said caliper members.

15. A calipering instrument, having in combination, a dial plate mounted for angular motion, a pointer cooperating with said dial plate and mounted for angular motion relatively to said dial plate, a caliper member operatively connected to said dial plate for moving it angularly, a second caliper member operatively connected to said pointer for moving it angularly, said caliper members being independently movable relatively to each other, and said operative connections between said caliper members and said dial plate and pointer comprising mechanism for causing the relative angular movement between said dial plate and pointer to be proportional to the relative movement between said caliper members.

16. A calipering instrument, having in combination, a dial plate mounted for angular motion, a pointer cooperating with said dial plate and mounted for angular motion relatively to said dial plate, a pair of caliper members mounted for independent relative movement, mechanism connecting one of said caliper members to said dial plate for causing motion of said caliper member to move said dial plate angularly, a second mechanism connecting the other of said caliper members to said pointer for causing motion of said caliper member to move said pointer angularly, and said mechanisms having means for causing the relative angular motion of said dial plate and pointer to be proportional to the relative movement between said caliper members.

17. A calipering instrument, having in combination, a movable dial plate and a relatively movable cooperating pointer independently movable calipering members, and mechanism actuated by said calipering members for causing relative motion between said dial plate and pointer in proportion to the displacement between said calipering members.

18. An instrument for calipering the internal diameter of cylindrical surfaces, having in combination, a support, a pair of oppositely disposed calipering rods provided with aligned calipering points, means for centering said calipering points with the diameters of such surfaces, a rotatable dial plate, a rotatable pointer cooperating with said dial plate, a separate rack for each calipering member reciprocated thereby, and separate gearing of the same gearing ratio connecting one rack with said dial plate and the other rack with said pointer.

19. An instrument for calipering the internal diameter of cylindrical surfaces, having in combination, a support, a pair of oppositely disposed calipering rods provided with aligned calipering points, means for adjusting the effective length of one of said calipering rods, means for centering said calipering points with the diameters of such surfaces, a rotatable dial plate, a rotatable pointer cooperating with said dial plate, a separate rack for each calipering member reciprocated thereby, and separate gearing of the same gearing ratio connecting one rack with said dial plate and the other rack with said pointer.

20. An instrument for calipering the internal diameter of cylindrical surfaces, having in combination, a support having portions for contacting the opposite ends of chords of the transverse sections of such surfaces, an indicator casing fixed to said support, oppositely projecting caliper rods extending from said casing and having calipering points on a line normal to and bisecting said chords, said caliper rods being movable relatively to each other and to said casing, a rotatable dial plate and a rotatable pointer for said dial plate carried by said casing, a pair of racks in said casing, one rack of said pair being reciprocated by one of said caliper rods and the other independently reciprocated by the other of said caliper rods, means for changing the effective length of one of said caliper rods, and independent mechanisms connecting said racks respectively to said dial plate and pointer for rotating said dial plate and pointer, and said mechanism acting to cause relative rotation of said dial plate and pointer in proportion to the relative motion between said calipering points of said rods.

21. A calipering instrument having in combination, an indicator, a pair of calipering members movable relatively to each other and to said indicator, mechanism responsive to motion of said calipering members for causing said indicator to indicate the degree of separation of said calipering members, and said mechanism permitting bodily movement of said indicator relatively to both calipering members while said calipering members are in contact with opposed relatively stationary surfaces without affecting the reading of said indicator.

22. A calipering instrument having in combination, an indicator, a pair of calipering members movable relatively to each other and to said indicator, said indicator having a movable pointer and a movable graduated member cooperating with said pointer, mechanism responsive to motion of said calipering members for causing said indicator to indicate the degree of separation of said calipering members, and said mechanism permitting bodily movement of said indicator relatively to both of said calipering members while said calipering members are in contact with opposed relatively stationary surfaces without affecting the reading of said indicator.

In testimony whereof, I have signed my name to this specification.

WARREN AMES.